United States Patent
Urakami et al.

(10) Patent No.: US 10,413,876 B2
(45) Date of Patent: Sep. 17, 2019

(54) MIXER INCLUDING A SENSOR FOR DETECTING MATERIAL TO BE MIXED, MIXING SYSTEM, AND METHOD OF PRODUCING MIXED PRODUCT

(71) Applicant: MITSUBISHI HEAVY INDUSTRIES MACHINERY SYSTEMS, LTD., Hyogo (JP)

(72) Inventors: Yoshihito Urakami, Hiroshima (JP); Jiro Agawa, Hiroshima (JP); Takashi Moribe, Hiroshima (JP); Shinichi Noguchi, Hiroshima (JP)

(73) Assignee: MITSUBISHI HEAVY INDUSTRIES MACHINERY SYSTEMS, LTD., Hyogo (JP)

( * ) Notice: Subject to any disclaimer, the term of this patent is extended or adjusted under 35 U.S.C. 154(b) by 420 days.

(21) Appl. No.: 15/108,774

(22) PCT Filed: Nov. 17, 2014

(86) PCT No.: PCT/JP2014/080342
§ 371 (c)(1),
(2) Date: Jun. 28, 2016

(87) PCT Pub. No.: WO2016/079783
PCT Pub. Date: May 26, 2016

(65) Prior Publication Data
US 2016/0325249 A1    Nov. 10, 2016

(51) Int. Cl.
*B01F 15/00* (2006.01)
*B29B 7/28* (2006.01)
(Continued)

(52) U.S. Cl.
CPC ......... *B01F 15/00389* (2013.01); *B01F 7/00* (2013.01); *B01F 15/00162* (2013.01);
(Continued)

(58) Field of Classification Search
CPC ......... B01F 15/00389; B01F 15/00162; B01F 7/00; B29B 7/7485; B29B 7/283;
(Continued)

(56) References Cited

U.S. PATENT DOCUMENTS

| 1,916,300 | A | * | 7/1933 | Cleveland | ............ B29B 7/286 366/142 |
| 3,447,201 | A | * | 6/1969 | Seanor | ............ B01F 15/00201 366/142 |

(Continued)

FOREIGN PATENT DOCUMENTS

| CN | 202037745 U | | 11/2011 | |
| DE | 901309 C | * | 1/1954 | ............ B29B 7/286 |

(Continued)

OTHER PUBLICATIONS

Machine Translation of JP H11916 (A)—Jan. 6, 1999 Sealed Type Kneading Machine, and its Kneading Method.*
(Continued)

*Primary Examiner* — Charles Cooley
(74) *Attorney, Agent, or Firm* — Kanesaka Berner and Partners, LLP (57) ABSTRACT

A mixer (2) includes: a pair of rotors (44) arranged to have a gap (SP2) therebetween; a casing (45) in which a chamber (C2) in which the pair of rotors (44) is disposed, an introduction port (51) for introducing a material to be mixed (W) into the chamber (C2), and a discharge port (52) for discharging the material to be mixed (W) from the chamber (C2) are formed; a sensor (80) which is disposed above the pair of rotors (44) and detects variation in position or pressure of the material to be mixed (W); and a control unit (82) which controls rotation of the pair of rotors (44), based on a detection result of the sensor (80).

6 Claims, 4 Drawing Sheets

(51) Int. Cl.
  *B01F 7/00* (2006.01)
  *B29B 7/74* (2006.01)
  *B29B 7/18* (2006.01)
  *B29B 7/26* (2006.01)
(52) U.S. Cl.
  CPC .............. *B29B 7/183* (2013.01); *B29B 7/263* (2013.01); *B29B 7/283* (2013.01); *B29B 7/286* (2013.01); *B29B 7/7466* (2013.01); *B29B 7/7485* (2013.01); *B29B 7/7495* (2013.01)
(58) Field of Classification Search
  CPC ....... B29B 7/183; B29B 7/263; B29B 7/7495; B29B 7/7466; B29B 7/28; B29B 7/286
  USPC .......................................................... 366/91
  See application file for complete search history.

(56) References Cited

U.S. PATENT DOCUMENTS

| | | | |
|---|---|---|---|
| 4,455,091 A | 6/1984 | Bamberger et al. | |
| 5,011,291 A * | 4/1991 | Peter | B29B 7/005 366/91 |
| 5,108,188 A * | 4/1992 | Peter | B29B 7/183 264/28 |
| 5,183,640 A * | 2/1993 | Peter | B29B 7/7466 422/135 |
| 5,251,977 A * | 10/1993 | Peter | B29B 7/7466 366/91 |
| 5,324,107 A * | 6/1994 | Tanaka | B29B 7/286 366/151.1 |
| 5,496,107 A * | 3/1996 | Peter | B29B 7/7466 366/91 |
| 5,865,535 A * | 2/1999 | Edwards | B29B 7/246 366/601 |
| 6,902,312 B2 * | 6/2005 | Peter | B29B 7/183 366/69 |
| 7,314,305 B2 * | 1/2008 | Proni | B29B 7/28 366/145 |
| 8,047,701 B2 * | 11/2011 | Naoi | B29B 7/183 366/76.7 |
| 9,162,196 B2 * | 10/2015 | Ozawa | B29B 7/183 |
| 10,265,884 B2 * | 4/2019 | Miura | B29B 7/46 |
| 2004/0125687 A1 | 7/2004 | Peter | |
| 2016/0001463 A1 * | 1/2016 | Miura | B29B 7/46 366/97 |
| 2017/0225359 A1 * | 8/2017 | Manabe | B29B 7/28 |

FOREIGN PATENT DOCUMENTS

| | | | | |
|---|---|---|---|---|
| DE | 3035353 A1 | 5/1982 | | |
| DE | 4037028 A1 | 5/1992 | | |
| JP | 63-242333 A | 10/1988 | | |
| JP | 4-201521 A | 7/1992 | | |
| JP | 6-179212 A | 6/1994 | | |
| JP | 7-40338 A | 2/1995 | | |
| JP | 07040338 A | * | 2/1995 | ............ B29B 7/845 |
| JP | 7-186138 A | 7/1995 | | |
| JP | 9-254147 A | 9/1997 | | |
| JP | 11-916 A | 1/1999 | | |
| JP | 11000916 A | * | 1/1999 | ............ B29B 7/183 |
| JP | 11057445 A | * | 3/1999 | ............ B29B 7/183 |
| JP | 11-147219 A | 6/1999 | | |
| JP | 2001-232632 A | 8/2001 | | |
| JP | 2007-54824 A | 3/2007 | | |
| JP | 2011-31558 A | 2/2011 | | |
| WO | WO-2016079783 A1 | * | 5/2016 | ................ B01F 7/00 |

OTHER PUBLICATIONS

Machine Translation of JP H0740338 (A)—Feb. 10, 1995 Twin-Screw Kneader.*
Office Action in TW Application No: 103139920, dated Aug. 10, 2016.
International Search Report in International Application No. PCT/JP2014/080342, dated Feb. 3, 2015.
Written Opinion in International Application No. PCT/JP2014/080342, dated Feb. 3, 2015.

* cited by examiner

MIXER INCLUDING A SENSOR FOR DETECTING MATERIAL TO BE MIXED, MIXING SYSTEM, AND METHOD OF PRODUCING MIXED PRODUCT

RELATED APPLICATIONS

The present application is a National Phase of PCT/JP2014/080342, filed Nov. 17, 2014.

TECHNICAL FIELD

The present invention relates to a mixer which mixes a material to be mixed, a mixing system provided with the mixer, and a method of producing a mixed product.

BACKGROUND ART

A mixer for producing mixed rubber which is a material of a rubber product by mixing a material to be mixed with various additives blended with, for example, raw rubber by rotating a pair of rotors in a chamber is generally known.

In the mixer, the pair of rotors rotates in directions different from each other, whereby the material to be mixed is pushed into a gap between the pair of rotors, and thus mixing is performed.

Here, in the material to be mixed, a degree of plasticity or the like is different according to a difference in material thereof, and therefore, even if the mixer is operated under the same conditions with respect to all the materials to be mixed, there is a case where it is not possible to sufficiently mix the material to be mixed. Therefore, for example, in the invention stated in PTL 1, correction of power consumption in a mixer is performed such that mixing is efficiently performed according to a material of the material to be mixed.

CITATION LIST

Patent Literature

[PTL 1] Japanese Unexamined Patent Application Publication No. H04-201521

SUMMARY OF INVENTION

Technical Problem

However, in the mixer disclosed in PTL 1, operation control of the mixer is not performed based on the state of the material to be mixed during mixing, and therefore, it is difficult to determine whether or not mixing can be sufficiently performed regardless of a difference in the material to be mixed.

Here, according to a material of the material to be mixed, it is not possible to make the material to be mixed be caught between a pair of rotors by smoothly pushing the material to be mixed into a gap between the pair of rotors during mixing, and there is a case where a portion of the material to be mixed stays at upper portions of the rotors and rises upward. In this case, it is not possible to sufficiently perform the mixing of the material to be mixed, and therefore, a technique of accurately determining such a state and reflecting the state in the mixing is required.

The present invention provides a mixer, a mixing system, and a method of producing a mixed product, in which it is possible to suppress poor mixing which occurs due to rising-up of a material to be mixed and perform appropriate mixing in accordance with a difference in a material of the material to be mixed.

Solution to Problem

According to a first aspect of the present invention, there is provided a mixer including: a pair of rotors arranged to have a gap therebetween; a casing in which a chamber in which the pair of rotors is disposed, an introduction port for introducing a material to be mixed into the chamber, and a discharge port for discharging the material to be mixed from the chamber are formed; a sensor which is disposed above the pair of rotors and detects variation in position or pressure of the material to be mixed; and a control unit which controls rotation of the pair of rotors, based on a detection result of the sensor.

According to such a mixer, when a portion of the material to be mixed rises upward without being caught between the rotors while the material to be mixed is introduced into the chamber and mixed therein, the rising-up portion is regarded as variation in position of the material to be mixed. This position variation is detected by the sensor, whereby it is possible to detect the occurrence of the rising-up portion by the sensor. Further, in the rising-up portion, the material to be mixed is not mixed, whereby in this portion, pressure variation occurs in the material to be mixed. By detecting this pressure variation by the sensor, it is possible to detect the occurrence of the rising-up portion by the sensor.

Accordingly, the control unit controls the rotation of the rotors, based on the detection result of such a sensor, whereby it is possible to make the rising-up portion of the material to be mixed be caught between the pair of rotors.

Further, in a mixer according to a second aspect of the present invention, the sensor in the first aspect may detect a position in an up-and-down direction of the material to be mixed.

It is possible to detect the occurrence of the rising-up portion of the material to be mixed by such a sensor. Then, the control unit controls the rotation of the rotors, based on the detection result of the sensor, whereby it is possible to make the rising-up portion of the material to be mixed be caught between the pair of rotors, and thus it is possible to perform more appropriate mixing.

Further, in a mixer according to a third aspect of the present invention, the control unit in the second aspect may vary rotational frequencies of the pair of rotors, based on a period of position variation in the up-and-down direction of the material to be mixed.

In this manner, by increasing or decreasing the rotational frequencies of the rotors based on the position variation in the up-and-down direction of the material to be mixed, that is, a period of variation in the height position of the top of the rising-up portion, it becomes possible to make the rising-up portion of the material to be mixed be caught between the pair of rotors, and thus it is possible to perform more appropriate mixing.

Further, in a mixer according to a fourth aspect of the present invention, the sensor in any one of the first to third aspects can further detect variation in position of the material to be mixed in a horizontal direction intersecting the up-and-down direction, and the control unit may control the rotation of the pair of rotors, based on the variation in position of the material to be mixed in the horizontal direction.

By performing such control, it becomes possible to make the rising-up portion of the material to be mixed be more efficiently caught between the pair of rotors, and thus it is possible to perform more appropriate mixing.

Further, a mixer according to a fifth aspect of the present invention may further include: a floating weight which blocks the introduction port in the first aspect, in which the sensor may detect variation in pressure of the material to be mixed by detecting variation in pressure which acts on the floating weight due to the material to be mixed.

If the rising-up portion of the material to be mixed occurs, pressure which acts on the floating weight due to the material to be mixed pressing the floating weight increases. Accordingly, by detecting variation in the pressure acting on the floating weight, it is possible to detect the occurrence of the rising-up portion of the material to be mixed, and the control unit controls the rotation of the rotors, based on the detection result of the sensor, whereby it becomes possible to make the rising-up portion of the material to be mixed be caught between the pair of rotors, and thus it is possible to perform more appropriate mixing.

Further, a mixer according to a sixth aspect of the present invention may further includes: a floating weight which blocks the introduction port in the first aspect, in which the sensor may detect variation in pressure of the material to be mixed by detecting displacement in the up-and-down direction of the floating weight.

If the rising-up portion of the material to be mixed occurs, the material to be mixed presses the floating weight, whereby the floating weight is pushed upward, and thus a position varies. Accordingly, by detecting the displacement in the up-and-down direction of the floating weight, it is possible to detect the occurrence of variation in the pressure of the material to be mixed, that is, the occurrence of the rising-up of the material to be mixed, and the control unit controls the rotation of the rotors, based on the detection result of the sensor, whereby it becomes possible to make the rising-up portion of the material to be mixed be caught between the pair of rotors, and thus it is possible to perform more appropriate mixing.

Further, according to a seventh aspect of the present invention, there is provided a mixing system including: the above-described mixer as a first mixer; and a second mixer disposed above or below the first mixer, in which a material to be mixed which has been mixed in one of the first mixer and the second mixer is introduced into the other and further mixed therein.

According to such a mixing system, when a portion of the material to be mixed rises upward without being caught between rotors during mixing in the first mixer, due to variation in the position or the pressure of the material to be mixed, it is possible to detect the occurrence of the rising-up portion by a sensor. Accordingly, a control unit controls the rotation of the rotors, based on the detection result of such a sensor, whereby it is possible to make the rising-up portion of the material to be mixed be caught between a pair of rotors.

Further, according to an eighth aspect of the present invention, there is provided a method of producing a mixed product, including: an introduction process of introducing a material to be mixed from an introduction port into a chamber in which a pair of rotors arranged to have a gap therebetween is disposed; a mixing process of mixing the material to be mixed introduced into the chamber, by the pair of rotors; a detection process of detecting variation in position or pressure of the material to be mixed disposed between the pair of rotors and the introduction port, while the material to be mixed is being mixed; and an adjustment process of adjusting rotation of the pair of rotors, based on a detection result in the detection process, in which a mixed product is produced by continuing the mixing process while executing the detection process and the adjustment process.

According to such a method of producing a mixed product, when a portion of the material to be mixed rises upward without being caught between the rotors during mixing, due to variation in the position or the pressure of the material to be mixed, it is possible to detect the occurrence of the rising-up portion. Accordingly, by adjusting the rotation of the rotors based on the detection result of such a sensor, it is possible to make the rising-up portion of the material to be mixed be caught between the pair of rotors.

Advantageous Effects of Invention

According to the mixer, the mixing system, and the method of producing a mixed product described above, it is possible to suppress poor mixing which occurs due to rising-up of the material to be mixed and perform appropriate mixing in accordance with a difference in a material of the material to be mixed.

DESCRIPTION OF EMBODIMENTS

[First Embodiment]

Figure 1:
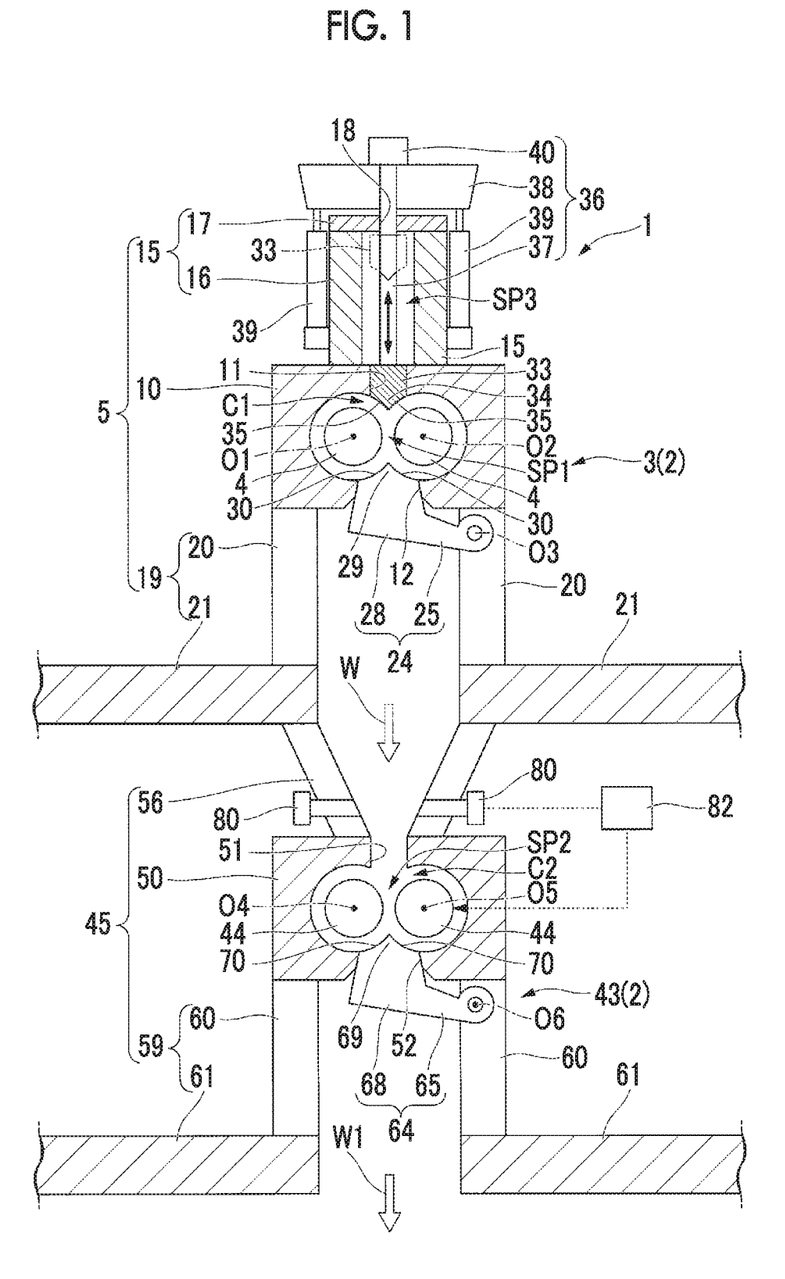
FIG. 1 is a vertical sectional view showing the entirety of a mixing system in a first embodiment of the present invention.
Figure 2:
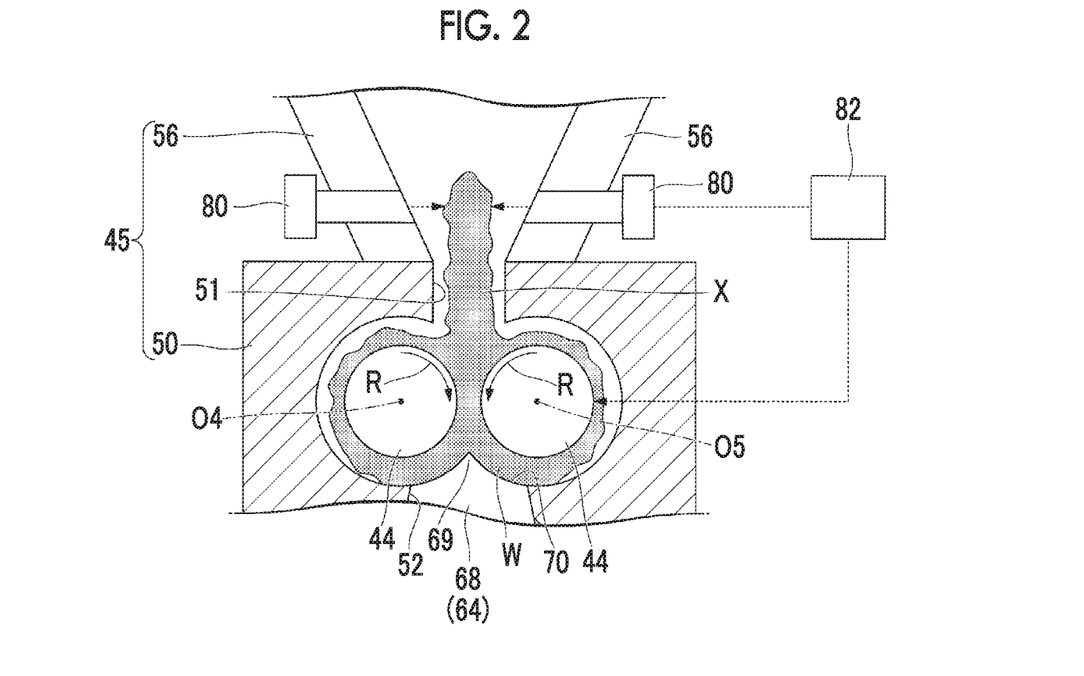
FIG. 2 is a diagram showing the state of a material to be mixed during mixing in the mixing system in the first embodiment of the present invention and is an enlarged view of a main section of FIG. 1.

Hereinafter, a mixing system 1 according to a first embodiment of the present invention will be described with reference to FIGS. 1 and 2.

The mixing system 1 according to this embodiment is a tandem type mixing apparatus provided with two mixers 2 connected one above the other.

Here, the mixer 2 on the lower side is set to be a lower mixer (a first mixer) 43, and the mixer 2 on the upper side is set to be an upper mixer (a second mixer) 3.

In the mixing system 1, a material to be mixed W which is composed to include, for example, raw rubber or the like is mixed in the upper mixer 3, then introduced into the lower mixer 43, and further mixed in the lower mixer 43, whereby a mixed product W1 is finally produced.

The upper mixer 3 is provided with a pair of rotors 4 arranged in a horizontal direction orthogonal to an up-and-down direction, a casing 5 which surrounds the rotors 4, a drop door 24 and a floating weight 33 provided at the casing 5, and a drive unit 36 which actuates the floating weight 33.

The pair of rotor 4 is arranged to have a gap SP1 therebetween in the horizontal direction. Each of the rotors 4 is made in the form of a column extending in the horizontal direction and rotatable around each of axes O1 and O2 which are orthogonal to the horizontal direction and are parallel to each other, by a power source (not shown). The rotors 4 rotate in the opposite directions to each other (refer to a rotation direction R of FIG. 2). That is, during normal operation, the portions of the outer peripheral surfaces which are located at the uppermost portions in the pair of rotors 4 rotate toward the gap SP1 so as to come close to each other.

The casing 5 has a main body part 10 which surrounds the pair of rotors 4, a drive unit support part 15 which extends upward from the main body part 10, and a drop door support part 19 which extends downward from the main body part 10.

A chamber C1 in which the pair of rotors 4 is disposed, an introduction port 11 for introducing the material to be mixed W into the chamber C1, and a discharge port 12 for discharging the material to be mixed W from the chamber C1 are formed in the main body part 10.

The chamber C1 is formed as a substantially elliptical space so as to surround the respective rotors 4 from the outer periphery side.

The introduction port 11 is open at an upper portion of the chamber C1, penetrates the main body part 10 to straightly extend upward, and makes the chamber C1 and the outside of the main body part 10 communicate with each other.

The discharge port 12 is open at a lower portion of the chamber C1, penetrates the main body part 10 to extend downward, and makes the chamber C1 and the outside of the main body part 10 communicate with each other. In this embodiment, the discharge port 12 is formed such that an opening is gradually expanded in diameter as it goes toward the lower side.

The drive unit support part 15 supports the drive unit 36 (the details thereof will be described later) and has a tubular part 16 which extends upward from the main body part 10 outside the introduction port 11, that is, so as to surround the introduction port 11 and is provided with a material chute door (not shown), and a lid part 17 which covers the tubular part 16 from above, and in which a through-hole 18 penetrating up and down is formed at a position above the introduction port 11.

The drop door support part 19 has a tubular part 20 having a tubular shape which extends outside the discharge port 12, that is, downward from the main body part 10 and extends also in the directions of the axes O1 and O2, and a pair of plate-like parts 21 which is connected to a lower portion of the tubular part 20 and has plate shapes extending in a direction away from each other in the horizontal direction.

The drop door 24 has a rotation support part 25 mounted on one side in the horizontal direction in the tubular part 20 so as to be rotatable with respect to the tubular part 20 around an axis O3 parallel to the axes O1 and O2 of the rotors 4, and a door part 28 which is provided integrally with the rotation support part 25 and can open and close the discharge port 12 from below according to the rotation of the rotation support part 25.

In this way, the door part 28 is formed so as to be reduced in diameter in a direction toward the chamber C1 to correspond to the diameter expansion shape of the discharge port 12 in a state of blocking the discharge port 12. Further, at a position facing the rotors 4 in the door part 28, a pair of curved surfaces 30 forming a protrusion portion 29 protruding toward the gap SP1 at a central portion in the horizontal direction is formed so as to be curved along the inner peripheral surface of the chamber C1 and the outer peripheral surfaces of the pair of rotors 4 in a state where the door part 28 blocks the discharge port 12.

The floating weight 33 is provided so as to be able to open and close the introduction port 11 from above. Further, at a position facing the rotors 4 in the floating weight 33, a pair of curved surfaces 35 forming a protrusion portion 34 protruding toward the gap SP1 at a central portion in the horizontal direction is formed so as to be curved along the inner peripheral surface of the chamber C1 and the outer peripheral surfaces of the pair of rotors 4 in a state where the floating weight 33 blocks the introduction port 11.

The drive unit 36 has a support rod 37 provided at an upper portion of the floating weight 33, an upper support part 38 on which the support rod 37 is mounted, and a pair of cylinders 39 mounted so as to extend downward from the upper support part 38.

The support rod 37 is provided integrally with the floating weight 33 so as to extend upward and is provided so as to be inserted into the through-hole 18 formed in the lid part 17 of the casing 5 and protrude upward from the lid part 17.

The upper support part 38 supports an upper end of the support rod 37 by a fixing member 40 such as a nut. Further, the upper support part 38 is provided so as to be disposed to be spaced apart upward from the tubular part 16 and the lid part 17, thereby covering the tubular part 16 and the lid part 17.

The pair of cylinders 39 is interposed between the respective surfaces facing the outside in the horizontal direction in the tubular part 16 and both end positions in the horizontal direction in the lower surface of the upper support part 38. The cylinders 39 expand and contract, thereby being able to relatively move the upper support part 38 in the up-and-down direction with respect to the tubular part 16.

The support rod 37 moves upward and downward according to the up-and-down movement of the upper support part 38, whereby the floating weight 33 moves upward and downward in a space SP3 in the tubular part 16 so as to come close to and be separated from the introduction port 11, and thus the floating weight 33 opens and closes the introduction port 11.

Next, the lower mixer 43 will be described. In this embodiment, the lower mixer 43 is shown in approximately the same size as the upper mixer 3. However, the size is not limited.

The lower mixer 43 is provided with a pair of rotors 44 arranged in the horizontal direction, a casing 45 in which a chamber C2 surrounding the rotors 44 is formed, and a drop door 64 provided at the casing 45, similar to the upper mixer 3.

The pair of rotor 44 is arranged to have a gap SP2 in the horizontal direction and respectively rotates around axes O4 and O5.

The drop door 64 has a rotation support part 65 and a door part 68 which rotate around an axis O6 parallel to the axes O4 and O5.

A pair of curved surfaces 70 forming a protrusion portion 69 is formed at the door part 68.

On the other hand, the lower mixer 43 is not provided with configurations corresponding to the floating weight 33 and the drive unit 36, unlike the upper mixer 3, and instead, is provided with a sensor 80 provided at the casing 45, and a control unit 82 which controls the rotation of the rotors 44, based on the detection result of the sensor 80.

The casing 45 has a main body part 50 in which the chamber C2, an introduction port 51, and a discharge port 52 which are the same as those of the upper mixers 3 are formed, a tubular part 56 which extends upward from the main body part 50, and a drop door support part 59 in which a tubular part 60 extending downward and a plate-like part 61 are formed, similar to the upper mixers 3.

The tubular part 56 is inclined such that wall surfaces on both sides in the horizontal direction in the tubular part 56 are separated from each other to the outside in the horizontal direction as it goes toward the upper side from the main body part 50, unlike the tubular part 16 of the upper mixers 3. Further, the tubular part 56 is connected to lower portions of the plate-like parts 21 in the upper mixer 3.

That is, the drop door support part 19 in the upper mixer 3 and the tubular part 56 in the lower mixer 43 are connected, whereby the discharge port 12 in the upper mixer 3 and the introduction port 51 in the lower mixer 43 communicate with each other. Accordingly, the material to be mixed W from the upper mixer 3 is introduced into the lower mixer 43.

The sensor 80 is, for example, an infrared sensor or the like, which is disposed above the pair of rotors 44 and provided so as to penetrate along the horizontal direction at each of both wall surfaces of the tubular part 56 in the casing 45. Further, the sensor 80 is made so as to detect a position in the up-and-down direction of the material to be mixed W in the chamber C2 of the lower mixer 43.

The control unit 82 controls the rotation of the rotors 44 in a case where a state where the material to be mixed W exists to a predetermined height position in the up-and-down direction is detected by the sensor 80, and for example, in this embodiment, in a case where a state where the apex of the material to be mixed W reaches a height position at which the tubular part 56 is provided is created. The control of the rotation in this embodiment is control to vary the rotational frequencies of the rotors 44. The control unit 82 is provided to be mounted on, for example, the casing 45.

Figure 3:
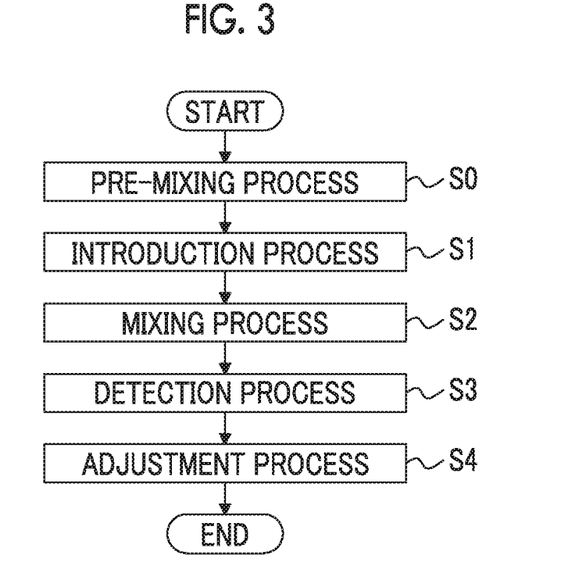
FIG. 3 is a flowchart showing the procedure of a method of producing a mixed product by mixing a material to be mixed, by the mixing system in the first embodiment of the present invention.

Next, a specific example regarding a mixing method by the mixing system 1 of this embodiment and control in the control unit 82 will be described with reference to FIG. 3.

First, the material to be mixed W is introduced from the introduction port 11 into the chamber C1 of the upper mixer 3, mixing is performed, and the material to be mixed W after the mixing is discharged from the discharge port 12 (a pre-mixing process S0).

Further, the material to be mixed W from the discharge port 12 is introduced from the introduction port in the lower mixer 43 into the chamber C2 (an introduction process S1).

Thereafter, the material to be mixed W is mixed by rotating the pair of rotors 44 (a mixing process S2).

Further, when the material to be mixed W is being mixed during the execution of the mixing process S2, variation in the height position in the up-and-down direction of the material to be mixed W disposed between the pair of rotors 44 and the introduction port 51 is detected by the sensor 80 (a detection process S3).

Then, the rotation of the pair of rotors 44 is adjusted by the control unit 82, based on the detection result in the detection process S3 (an adjustment process S4).

Figure 4:
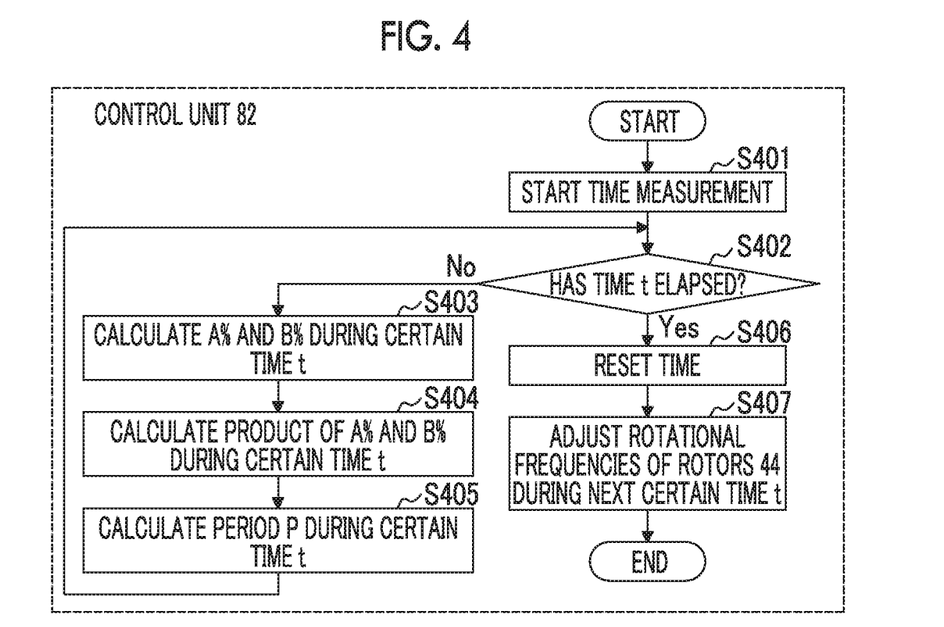
FIG. 4 is a diagram describing a processing flow in a control unit when carrying out a detection process and an adjustment process in a method of producing a mixed product by the mixing system in the first embodiment of the present invention.

Here, a processing flow in the control unit 82 during the execution of the detection process S3 and the adjustment process S4 will be described with reference to FIGS. 2 and 4.

Hereinafter, when a portion of the material to be mixed W has risen up so as to be disposed in the tubular part 56 in the up-and-down direction (refer to a rising-up portion X of FIG. 2), the ratio of the amount of the rising-up portion X to the total amount (volume or weight) of the material to be mixed W which is being mixed in the lower mixer 43 is set to be A %. The amount of the rising-up portion X is calculated by, for example, the distance from the position of the apex of the rising-up portion X to the outer peripheral surface of the rotor 44, which is located at the uppermost portion, and thickness dimensions in the horizontal direction and the directions of the axes O4 and O5.

Further, the ratio of a time when the rising-up portion X is occurring to a mixing time of the material to be mixed W in the lower mixer 43 is set to be B %.

In the control unit 82, first, the measurement of time is started (Step S401). Thereafter, whether or not a certain time t has elapsed is determined (Step S402).

While in Step S402, it is determined to be No, the measurement is continued and the ratio A % during the certain time t (an integration value during the time t) and the ratio B % during the certain time t are calculated from the detection result of the sensor 80 (Step S403).

Thereafter, the product of A % and B % is calculated (Step S404).

Further, in parallel with Steps S403 and S404, a period P in which the rising-up portion X of the material to be mixed W occurs during the certain time t is calculated (Step S405).

Then, in a case where the time t has elapsed, that is, in a case where in Step S402, it is determined to be Yes, the measurement time is reset (Step S406) and during the next certain time t, control is performed such that the numerical value of the product of A % and B % becomes the minimum and so as to reduce the rotational frequencies of the rotors 44 with the period P (Step S407).

Then, as described above, in the control unit 82, each of Steps S401 to S407 is repeated, that is, the detection process S3 and the adjustment process S4 are repeated while executing the mixing process S2, whereby the rotational frequencies of the pair of rotors 44 are varied based on the period of the position variation in the up-and-down direction of the material to be mixed W.

According to the mixing system 1 of this embodiment described above, while the material to be mixed W is introduced into the chamber C2 of the lower mixer 43 and mixed therein, when a portion of the material to be mixed W is not caught between the pair of rotors 44 and the rising-up portion X occurs, the occurrence of the rising-up portion X can be detected as the position variation in the up-and-down direction (the height direction) of the material to be mixed W by the sensor 80.

Then, in the control unit 82, it becomes possible to make the rising-up portion X be caught between the rotors 44 by a control method of increasing or decreasing the rotational frequencies of the rotors 44, based on the detection result of the sensor 80, that is, based on the numerical value of the product of A % and B % and the period P of the occurrence of the rising-up portion X.

Therefore, poor mixing occurring due to the rising-up of the material to be mixed W can be suppressed, and it becomes possible to perform appropriate mixing in accordance with a difference in a material of the material to be mixed W.

Further, due to the control of the rotation of the rotors 44 by the sensor 80 and the control unit 82, measures such as suppressing the occurrence of the rising-up portion X of the material to be mixed W, for example, by increasing the chamber C2 of the lower mixer 43 becomes unnecessary, and thus it is possible to attain the downsizing of the mixing system 1.

In the case described above, the rotation of the pair of rotors 44 is adjusted by the control unit 82 in the adjustment process S4. However, a worker may manually adjust the rotation of the rotors 44, based on the detection result in the detection process S3.

Further, the floating weight 33 is provided in the upper mixer 3. However, it need not be necessarily provided. On the other hand, a device corresponding to the floating weight 33 may also be provided in the lower mixer 43.

[Second Embodiment]

Figure 5:
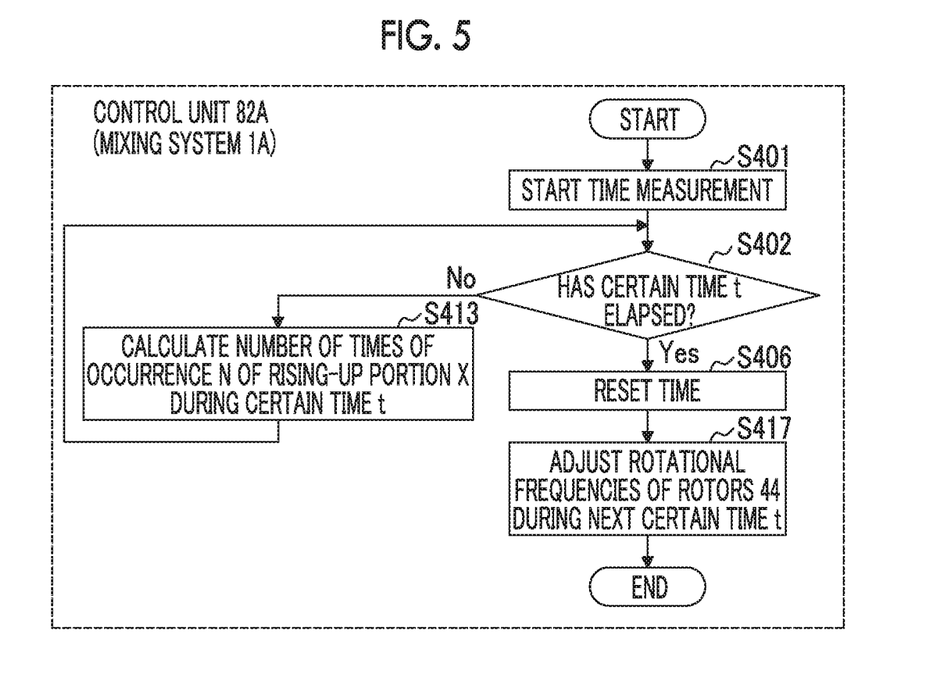
FIG. 5 is a diagram describing a processing flow in a control unit when carrying out a detection process and an adjustment process in a mixing method of mixing a material to be mixed, by a mixing system in a second embodiment of the present invention.

Next, a second embodiment of the present invention will be described with reference to FIG. 5.

The same constituent elements as those in the first embodiment are denoted by the same reference numerals and detailed description thereof is omitted.

While a mixing system 1A of this embodiment is common with that of the first embodiment in that a control unit 82A varies the rotational frequencies of the pair of rotors 44, based on the period of the position variation in the up-and-down direction of the material to be mixed W, a control method thereof is different.

That is, in the control unit 82A, when in the determination of whether or not the certain time t has elapsed in Step S402, it is determined to be No, the number of times that the rising-up portion X occurs during the certain time t, that is, the number of times N that the sensor 80 detects the position variation in the up-and-down direction of the material to be mixed W is calculated (Step S413).

Then, the control unit 82A reduces the rotational frequencies of the pair of rotors 44 in the same number of times N and with the same period as that when measuring the number of times N, during the next certain time t (Step S417). Thereafter, control to repeat these steps is performed.

According to the mixing system 1A of this embodiment, similar to the first embodiment, a control method of increasing or decreasing the rotational frequencies of the rotors 44 according to the period of variation in the height position of the rising-up portion X of the material to be mixed W according to the detection result of the sensor 80 in the control unit 82A is adopted. Therefore, it becomes possible to make the rising-up portion X of the material to be mixed W be caught between the rotors 44, poor mixing occurring due to the occurrence of the rising-up portion X of the material to be mixed W can be suppressed, and it is possible to perform appropriate mixing in accordance with a difference in a material of the material to be mixed W.

[Third Embodiment]

Figure 6:
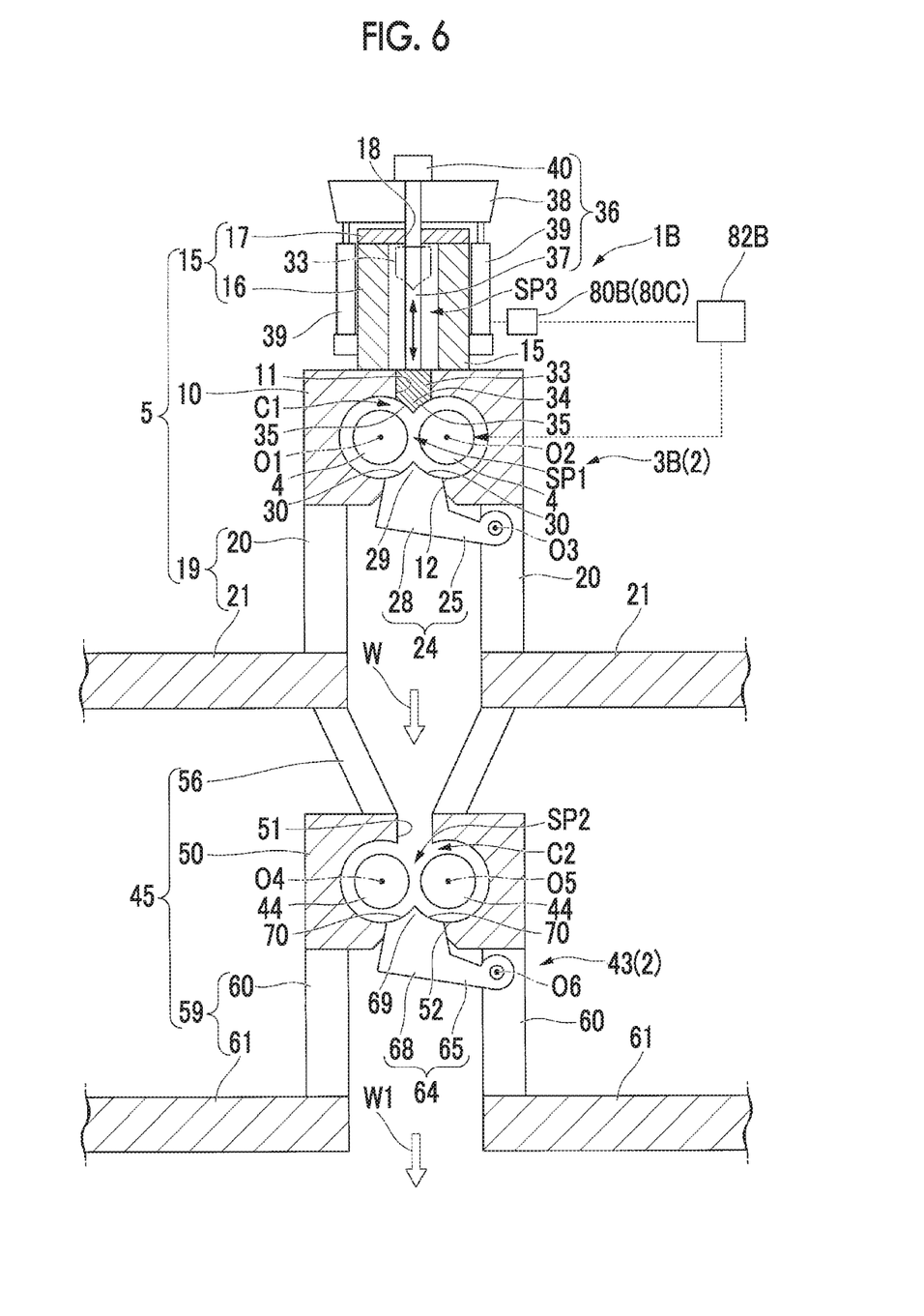
FIG. 6 is a vertical sectional view showing the entirety of a mixing system in a third embodiment of the present invention.

Next, a third embodiment of the present invention will be described with reference to FIG. 6.

The same constituent elements as those in the first embodiment and the second embodiment are denoted by the same reference numerals and detailed description thereof is omitted.

In a mixing system 1B of this embodiment, a sensor 80B is different from those of the first embodiment and the second embodiment. That is, the sensor 80B of this embodiment is a sensor which detects variation in the pressure of the material to be mixed W in an upper mixer 3B (a first mixer) by detecting variation in pressure acting on the floating weight 33.

Specifically, the sensor 80B is a pressure sensor which is provided at least one of the pair of cylinders 39 in the upper mixer 3B, or piping thereof, thereby being able to detect a pressing force of the cylinder 39 acting on the floating weight 33.

In a control unit 82B, when a pressing force in the cylinder 39 has become greater than or equal to a predetermined value set in advance, the rising-up portion X is regarded as occurring in the material to be mixed W, and for example, the same processing flow as the processing flows in the control units 82 and 82A described in the first embodiment and the second embodiment is executed, thereby performing the control of the rotation of the rotors 44 and suppressing the occurrence of the rising-up portion X.

According to the mixing system 1B of this embodiment, by detecting variation in the pressing force in the cylinder 39 in the sensor 80B, it is possible to detect pressure variation of the material to be mixed W, that is, the occurrence of the rising-up portion X.

More specifically, if the rising-up portion X occurs in the material to be mixed W, the rising-up portion X presses the floating weight 33, whereby pressure acting on the floating weight 33 increases. Then, variation in the pressure acting on the floating weight 33 can be detected as variation in pressing force in the cylinder 39, and therefore, it is possible to detect the pressure variation of the material to be mixed W, that is, the occurrence of the rising-up portion X of the material to be mixed W.

Then, by controlling the rotation of the pair of rotors 44 in the control unit 82B based on the detection result of the sensor 80B, it becomes possible to make the rising-up portion X of the material to be mixed W be caught between the pair of rotors 44, and thus it is possible to perform more appropriate mixing.

Here, in the initial stage of the mixing start of the material to be mixed W, the floating weight 33 is gradually pushed into the introduction port 11. However, by suppressing the occurrence of the rising-up portion X of the material to be mixed W by the control unit 82B, it is possible to reduce the time until the floating weight 33 is fully pushed into the introduction port 11, that is, it becomes possible to reduce the caught time of the material to be mixed W in the initial stage of the mixing start.

Here, in this embodiment, instead of the sensor 80B which detects variation in pressure acting on the floating weight 33, a position sensor (a sensor 80C) which detects displacement in the up-and-down direction of the floating weight 33 by detecting the stroke amount of the cylinder 39 may be used.

Specifically, if the rising-up portion X occurs in the material to be mixed W, the rising-up portion X presses the floating weight 33, whereby the floating weight 33 is pushed upward, and thus a position varies, and the stroke amount of the cylinder 39 varies. Therefore, it is possible to detect the displacement in the up-and-down direction of the floating weight 33 from the variation amount of the stroke of the cylinder 39 by the sensor 80C, and it is possible to detect the occurrence of variation in the pressure of the material to be mixed W, that is, the occurrence of the rising-up portion X of the material to be mixed W.

The embodiments of the present invention have been described in detail above with reference to the drawings. However, each configuration, combinations thereof, or the like in each embodiment is an example, and addition, omission, substitution, and other changes of a configuration can be made within a scope which does not depart from the gist of the present invention. Further, the present invention is not limited by the embodiments, but is limited only by the scope of the appended claims.

In the mixing systems 1 (1A and 1B) of the embodiments described above, the two mixers 2 are provided one above the other. However, for example, the two mixers 2 may be disposed so as to be arranged in the horizontal direction.

Further, in this case, the sensors 80 (80B or 80C) and the control units 82 (82A or 82B) may be provided in the respective mixers 2. In a case of adopting the sensor 80B (80C), it is necessary to provide the floating weight 33 in each mixer 2.

Further, a configuration may be made in which when the rising-up portion X of the material to be mixed W is displaced to right and left in the horizontal direction, the position in the right and left of the rising-up portion X is detected by the sensor 80 and the control of the rotation of the rotors 44 is performed by the control unit 82 or manually based on the detection result. In this case, the occurrence of the rising-up portion X may be suppressed by controlling the position in the right-and-left direction of the rising-up portion X, for example, by making the respective rotational frequencies of the pair of rotors 44 different from each other. In this case, it is possible to make the rising-up portion X be more efficiently caught between the pair of rotors 44.

Further, at the time of the occurrence of the rising-up portion X, the rotational frequencies of the rotors 44 may be not only reduced, but also increased in some cases.

INDUSTRIAL APPLICABILITY

According to the mixer, the mixing system, and the method of producing a mixed product described above, it is possible to suppress poor mixing which occurs due to rising-up of the material to be mixed and perform appropriate mixing in accordance with a difference in a material of the material to be mixed.

REFERENCE SIGNS LIST

1, 1A, 1B: mixing system
2: mixer
3: upper mixer (second mixer)
3B: upper mixer (first mixer)
4: rotor
5: casing
10: main body part
11: introduction port
12: discharge port
15: drive unit support part
16: tubular part
17: lid part
18: through-hole
19: drop door support part
20: tubular part
21: plate-like part
24: drop door
25: rotation support part
28: door part
29: protrusion portion
30: curved surface
33: floating weight
34: protrusion portion
35: curved surface
36: drive unit
37: support rod
38: upper support part
39: cylinder
40: fixing member
43: lower mixer (first mixer)
44: rotor
45: casing
50: main body part
51: introduction port
52: discharge port
56: tubular part
59: drop door support part
60: tubular part
61: plate-like part
64: drop door
65: rotation support part
68: door part
69: protrusion portion
70: curved surface
80, 80B, 80C: sensor
82, 82A, 82B: control unit
X: rising-up portion
C1, C2: chamber
SP1, SP2: gap
SP3: space
O1, O2, O3, O4, O5, O6: axis
W: material to be mixed
W1: mixed product
S0: pre-mixing process
S1: introduction process
S2: mixing process
S3: detection process
S4: adjustment process

The invention claimed is:

1. A mixer comprising:
a pair of rotors arranged to have a gap therebetween;
a casing in which a chamber in which the pair of rotors is disposed, an introduction port for introducing a material to be mixed into the chamber, and a discharge port for discharging the material to be mixed from the chamber are formed;
a sensor which is disposed above the pair of rotors and detects variation in position of the material to be mixed; and
a control unit which controls rotation of the pair of rotors, based on a detection result of the sensor, wherein
the sensor detects a position in an up-and-down direction of the material to be mixed,
the control unit varies rotational frequencies of the pair of rotors, based on a period of time of position variation in the up-and-down direction of the material to be mixed, and
the rotors are controlled via the control unit to increase or decrease the rotational frequencies of the rotors during a second certain time such that the numerical value of a product of A % and B % is a minimum value on a condition that a ratio of an amount of a rising-up portion in a first certain time before the second certain time to a total amount of the material to be mixed is set to be A % and a ratio of a time when the rising-up portion is occurring to a mixing time of the material to be mixed in the first certain time is set to be B %, when a portion of the material to be mixed is risen up in the up-and-down direction and the rising-up portion occurs.

2. The mixer according to claim 1, wherein the sensor can further detect variation in position of the material to be mixed in a horizontal direction intersecting the up-and-down direction, and the control unit controls the rotation of the pair of rotors, based on the variation in position of the material to be mixed in the horizontal direction.

3. A mixing system comprising:
the mixer according to claim 1, as a first mixer; and
a second mixer disposed above or below the first mixer,
wherein a material to be mixed which has been mixed in one of the first mixer and the second mixer is introduced into the other and further mixed therein.

4. A mixer comprising:
a pair of rotors arranged to have a gap therebetween;
a casing in which a chamber in which the pair of rotors is disposed, an introduction port for introducing a material to be mixed into the chamber, and a discharge port for discharging the material to be mixed from the chamber are formed;
a sensor which is disposed above the pair of rotors and detects variation in position of the material to be mixed; and
a control unit which controls rotation of the pair of rotors, based on a detection result of the sensor, wherein
the sensor detects a position in an up-and-down direction of the material to be mixed,
the control unit varies rotational frequencies of the pair of rotors, based on a period of time of position variation in the up-and-down direction of the material to be mixed, and
the rotors are controlled via the control unit to increase or decrease the rotational frequencies of the rotors during a second certain time based on a number of times that a rising-up portion occurs during a first certain time before the second certain time, when a portion of the material to be mixed is risen up in the up-and-down direction and the rising-up portion occurs.

5. A method of producing a mixed product, the method comprising:
an introduction process of introducing a material to be mixed from an introduction port into a chamber in which a pair of rotors arranged to have a gap therebetween is disposed;
a mixing process of mixing the material to be mixed introduced into the chamber, by the pair of rotors;
a detection process of detecting variation in position of the material to be mixed disposed between the pair of rotors and the introduction port, while the material to be mixed is being mixed; and
an adjustment process of adjusting rotation of the pair of rotors, based on a detection result in the detection process,
wherein rotational frequencies of the pair of rotors are varied in the adjustment process, based on a period of time of position variation in an up-and-down direction of the material to be mixed,
the rotors are controlled to increase or decrease the rotational frequencies of the rotors during a second certain time such that the numerical value of a product of A % and B % is a minimum value on a condition that a ratio of an amount of a rising-up portion in a first certain time before the second certain time to a total amount of the material to be mixed is set to be A % and a ratio of a time when the rising-up portion is occurring to a mixing time of the material to be mixed in the first certain time is set to be B %, when a portion of the material to be mixed is risen up in the up-and-down direction and the rising-up portion occurs, and
a mixed product is produced by continuing the mixing process while executing the detection process and the adjustment process.

6. A method of producing a mixed product, the method comprising:
an introduction process of introducing a material to be mixed from an introduction port into a chamber in which a pair of rotors arranged to have a gap therebetween is disposed;
a mixing process of mixing the material to be mixed introduced into the chamber, by the pair of rotors;
a detection process of detecting variation in position of the material to be mixed disposed between the pair of rotors and the introduction port, while the material to be mixed is being mixed; and
an adjustment process of adjusting rotation of the pair of rotors, based on a detection result in the detection process,
wherein rotational frequencies of the pair of rotors are varied in the adjustment process, based on a period of time of position variation in an up-and-down direction of the material to be mixed,
the rotors are controlled to increase or decrease the rotational frequencies of the rotors during a second certain time based on a number of times that a rising-up portion occurs during a first certain time before the second certain time, when a portion of the material to be mixed is risen up in the up-and-down direction and the rising-up portion occurs,
a mixed product is produced by continuing the mixing process while executing the detection process and the adjustment process.

* * * * *